United States Patent
Rivers, Jr. et al.

(10) Patent No.: US 8,144,438 B2
(45) Date of Patent: Mar. 27, 2012

(54) MOTOR CONTROL CENTER COMMUNICATION SYSTEM

(75) Inventors: Cecil Rivers, Jr., West Hartford, CT (US); Thomas Frederick Papallo, Jr., Farmington, CT (US)

(73) Assignee: General Electric Company, Schenectady, NY (US)

( * ) Notice: Subject to any disclaimer, the term of this patent is extended or adjusted under 35 U.S.C. 154(b) by 662 days.

(21) Appl. No.: 12/245,386

(22) Filed: Oct. 3, 2008

(65) Prior Publication Data

US 2010/0085677 A1    Apr. 8, 2010

(51) Int. Cl.
*H02H 5/04* (2006.01)
*H02H 7/08* (2006.01)
*H02H 7/09* (2006.01)

(52) U.S. Cl. ............... 361/23; 361/24; 361/30; 361/31; 361/33

(58) Field of Classification Search ............... 361/23
See application file for complete search history.

(56) References Cited

U.S. PATENT DOCUMENTS

| | | | | |
|---|---|---|---|---|
| 5,528,445 A | * | 6/1996 | Cooke et al. | 361/20 |
| 6,160,365 A | * | 12/2000 | Younger et al. | 318/16 |
| 6,198,613 B1 | * | 3/2001 | Rozman | 361/93.1 |
| 6,445,332 B1 | * | 9/2002 | Younger et al. | 341/176 |
| 7,333,345 B2 | * | 2/2008 | Holce et al. | 361/752 |
| 7,606,011 B2 | * | 10/2009 | Weldon | 361/23 |
| 2005/0190511 A1 | * | 9/2005 | Crane et al. | 361/23 |
| 2009/0141432 A1 | * | 6/2009 | Kingston | 361/676 |

OTHER PUBLICATIONS http://www.us.squared.com/us/products/motor_control_centers.nsf/unid/169092EFC0A0EE8085256D7F005FB0EA/Sfile/OMNIFrameset.htm, Sep. 15, 2008, 1 page.
http://www.eaton.com/EatonCom/Markets/Electrical/Products/MotorControl/MCCCommunications/DeviceNetMCC/index.htm, Sep. 15, 2008, pp. 1-3.

* cited by examiner

*Primary Examiner* — Dharti Patel
(74) *Attorney, Agent, or Firm* — Cantor Colburn LLP (57) ABSTRACT

A motor control center communication system configured to interface with a communication network. The system includes a plurality of motor control units (MCUs), and a MCU controller configured to transmit and receive data signals via the communication network to and from, the plurality of MCUs. Each of the plurality of MCUs includes a magnetic contactor having electrical contacts operable between open and closed positions, and a local control module operatively connected to the associated magnetic contactor and to the MCU controller, and configured to monitor a status of the electrical contacts, transmit the monitored status information to the MCU controller, and actuate the associated magnetic contactor based on data signals received from the MCU controller.

19 Claims, 12 Drawing Sheets

MOTOR CONTROL CENTER COMMUNICATION SYSTEM

BACKGROUND OF THE INVENTION

This invention relates to a motor control center (MCC) communication system. More particular, this invention relates to a MCC communication system that employs a centralized control configuration for controlling buckets within a MCC of the MCC communication system.

A MCC manages the application of electrical power to motors. The MCC is typically connected to a main power line that feeds three-phase ac power into the MCC. An example MCC is a multi-compartment steel enclosure with a bus system to distribute electrical power on a common bus to a plurality of motor control units mountable within the compartments. These motor control units are referred to as "buckets". These buckets include various electronic components such as magnetic contactors, overload relays, and circuit breakers, for example. In a conventional bucket, communication is built into the electronic components. For example, the overload relay may include a communication port for communicating current and voltage status along with motor actuating capability. In a conventional MCC, a plurality of the buckets are operatively connected and controlled via control wiring of approximately 120V or higher to a remote panel. This often requires hundreds of feet of control wiring in conduit. During the course of operations, controls within the buckets may need to be upgraded. Thus, in order to upgrade the controls, the control wiring may have to be changed and additional wiring may be required which may result in crowded wire passages within conduit, and increased installation and maintenance costs.

While existing MCC communication systems are suitable for their intended purpose, there is a need for an improved MCC communication system that allows for flexibility in expanding an installed MCC communication system, and also utilizes low voltage control wiring, to thereby reduce manufacturing and maintenance costs for the system.

BRIEF DESCRIPTION OF THE INVENTION

An exemplary embodiment of the present invention provides a motor control center communication system configured to interface with a communication network. The system includes a plurality of motor control units (MCUs), and a MCU controller configured to transmit and receive data signals via the communication network to and from, the plurality of MCUs. Each of the plurality of MCUs includes a magnetic contactor having electrical contacts operable between open and closed positions, and a local control module operatively connected to the associated magnetic contactor and to the MCU controller, and configured to monitor a status of the electrical contacts, transmit the monitored status information to the MCU controller, and actuate the associated magnetic contactor based on data signals received from the MCU controller.

Another exemplary embodiment of the present invention provides a motor control unit (MCU) for a motor control center communication system. The MCU includes a magnetic contactor having electrical contacts operable between open and closed positions, and a local control module operatively connected to the magnetic contactor and to a MCU controller disposed external to the MCU, and configured to monitor a status of the electrical contacts, transmit the monitored status information to the MCU controller via a communication network, and actuate the associated magnetic contactor based on data signals received back from the MCU controller.

Additional features and advantages are realized through the techniques of exemplary embodiments of the invention. Other embodiments and aspects of the invention are described in detail herein and are considered a part of the claimed invention. For a better understanding of the invention with advantages and features thereof, refer to the description and to the drawings.

DETAILED DESCRIPTION OF THE INVENTION

Figure 1:
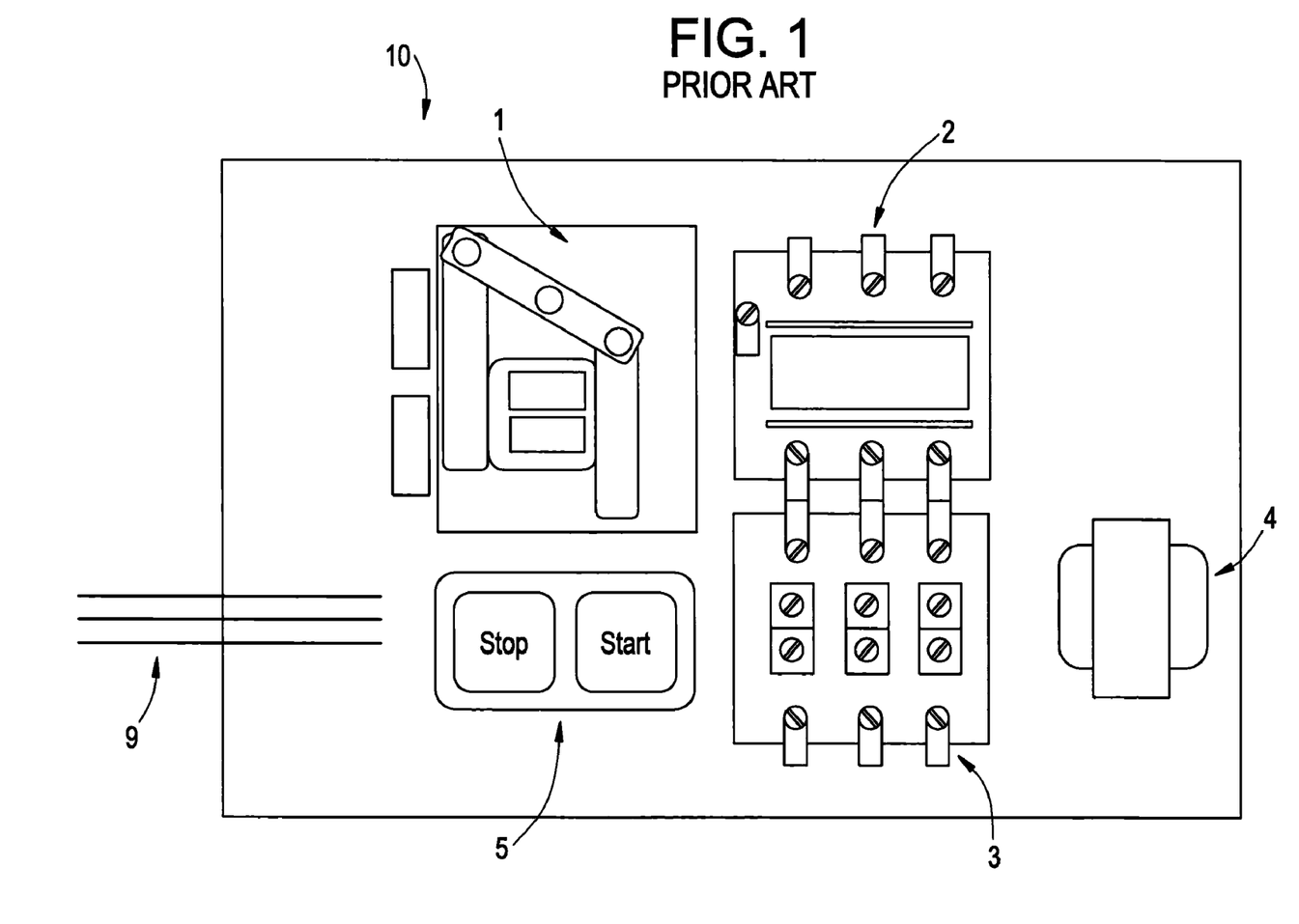
FIG. 1 is a front view of a conventional motor control unit.

Turning now to the drawings in greater detail, it will be seen that in FIG. 1, there is a conventional motor control unit 10 that includes a primary disconnect or circuit breaker 1 to protect from instantaneous faults, a magnetic contactor 2 which facilitates and interrupts current flow to a motor, an overload relay 3 to protect the motor from overcurrent conditions by sensing the current flowing to the motor, a control power transformer 4 to power the motor control unit 10 and operator controls 5 to operate the motor control unit 10.

Figure 2:
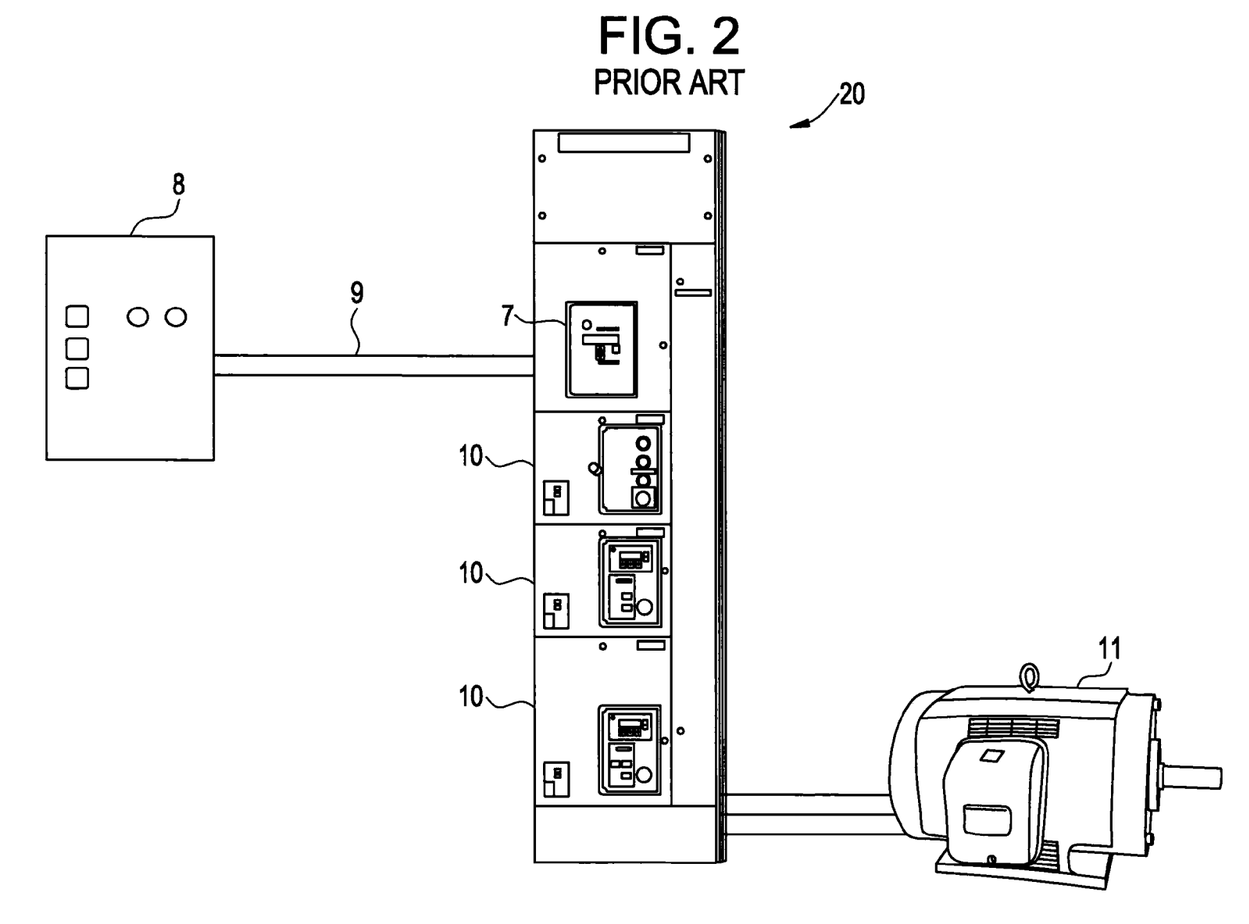
FIG. 2 is a front view of a conventional MCC communication system.

FIG. 2 is a diagram of a conventional MCC communication system 20. As shown in FIG. 2, a plurality of motor control units 10 are stacked together and operatively connected to different motors. These motor control units 10 are connected to a remote panel 8 via control wiring 9 of approximately 120 V. The motor control units 10 receive three-phase power from a power source 11.

Figure 3:
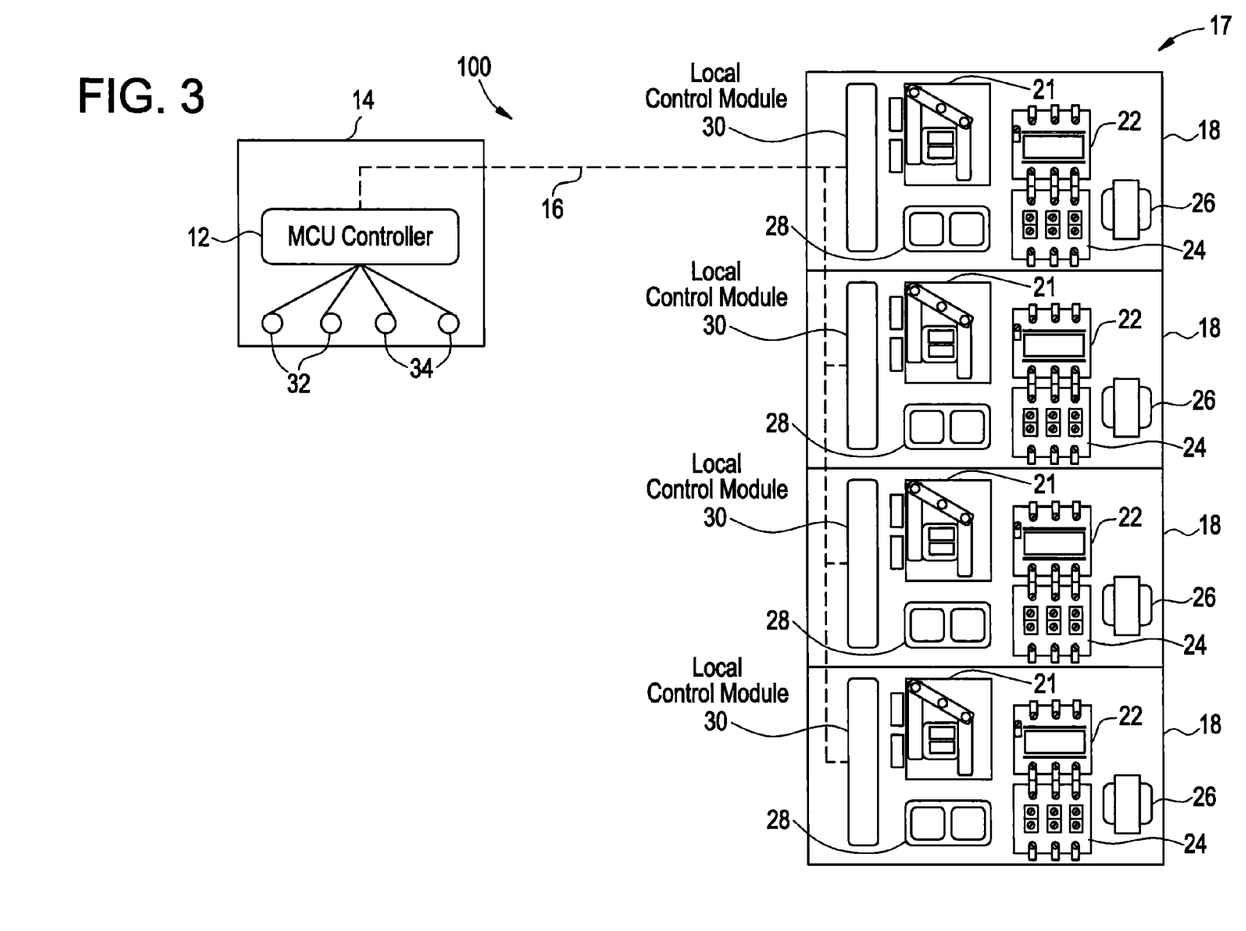
FIG. 3 is diagram of a MCC communication system that can be implemented within embodiments of the present invention.

FIG. 3 illustrates a MCC communication system that can be implemented within an embodiment of the invention. As shown FIG. 3, the MCC communication system 100 includes at least one MCU controller 12 and a MCC 17 including a plurality of motor control units 18. The MCU controller 12 is disposed remotely from the MCC 17 in a remote panel 14. Alternatively, according to another exemplary embodiment, the MCU controller 12 may be disposed in the MCC 17. The MCU controller 12 transmits and receives data signals via a communication network 16.

Figure 12:
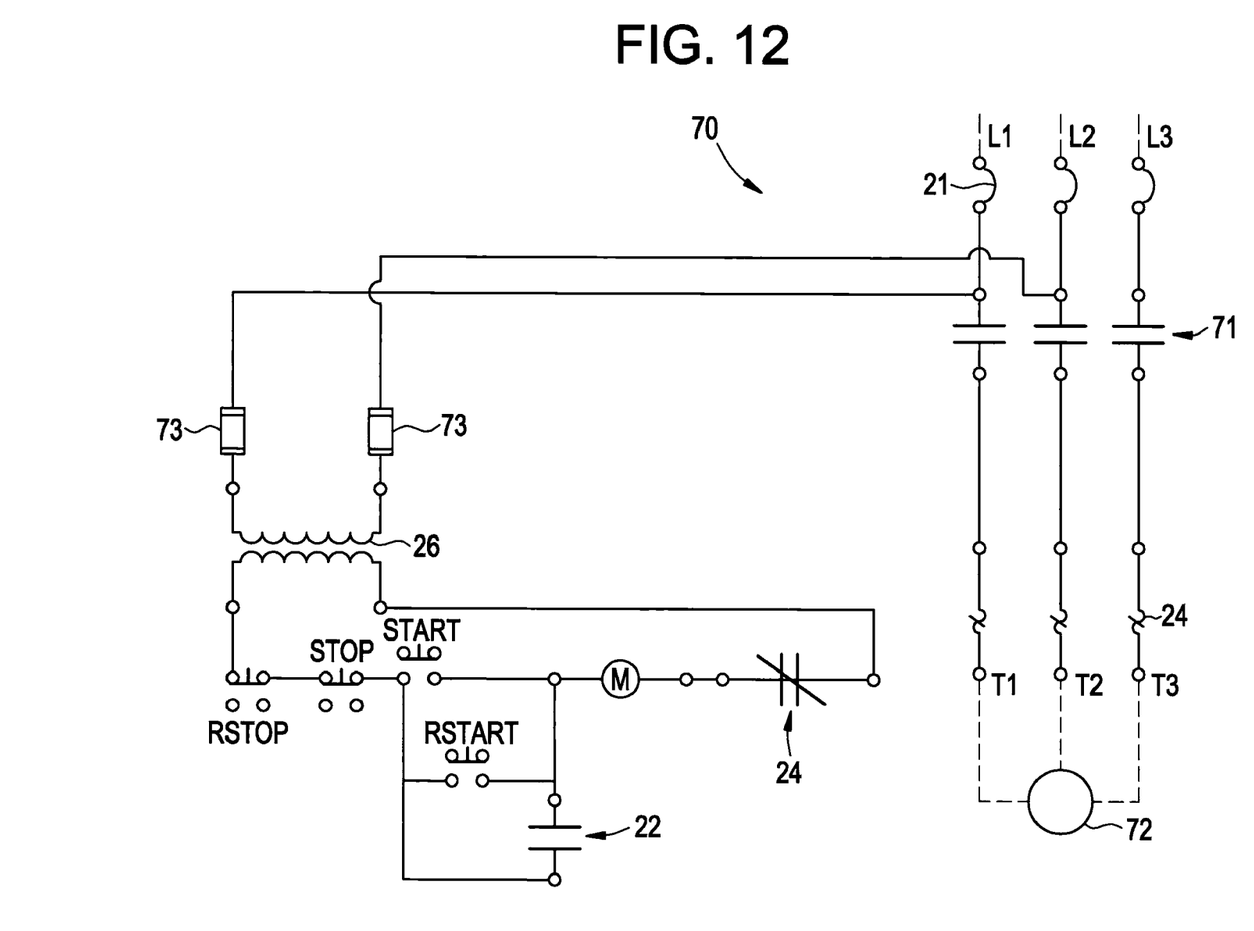
FIG. 12 is a circuit diagram of a FVNR Motor Starter that can be implemented within embodiments of the present invention.

According to an exemplary embodiment, each motor control unit 18 includes a plurality of electronic components, for example, a primary disconnect or circuit breaker 21, a magnetic contactor 22 having electrical contacts operable between open and closed positions, an overload relay 24, a control power transformer 26 and operator controls 28, for example. Each motor control unit 18 further includes a local control module 30 which is operatively connectable to the magnetic contactor 22 and to the MCU controller 12, and monitors a status of the contacts (as depicted in FIG. 12, for example) of the magnetic contactor 22 to determine whether the contacts are open or closed, and transmits contact status information to the MCU controller 12 when requested. The MCU controller 12 sends a data signal to the respective local control module 30, instructing the local control module 30 to open or close the contacts (details and operational characteristics of the local control module 30 are discussed below in connection with FIGS. 8 and 9). The local control module 30 then actuates the magnetic contactor 22 based on the data signals received from the MCU controller 12.

According to an exemplary embodiment, as shown in FIG. 3, the MCU controller 12 includes at least one input device 32, for example, pushbuttons or switches to receive commands, and transmits the commands to each of the local control modules 30 via the communication network 16. The MCU controller 12 may also include status indicators 34 to indicate the status of each motor control unit 18 or an alarm, for example. According to alternative embodiments, a plurality of MCU controllers 12 may be provided. The present invention is not limited to any particular number of MCU controllers 12 or local control modules 30 being provided on the communication network 16. The number of MCU controllers 12 and local control modules 30 may vary for example dependent upon the bandwidth capability and the load on the line (as depicted in FIG. 4).

Figure 4:
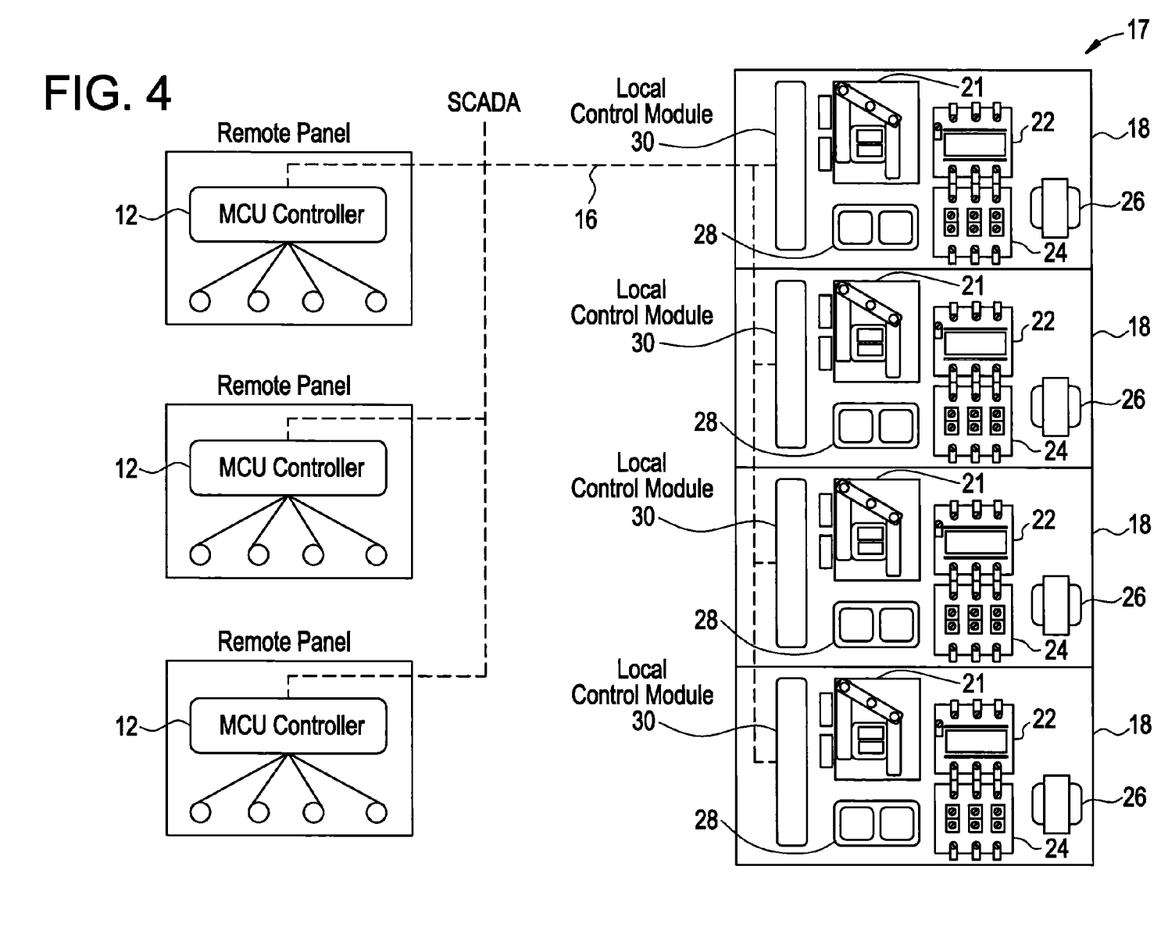
FIG. 4 is a diagram of a MCC communication system that can be implemented within alternative embodiments of the present invention.

As shown in FIG. 4, when the MCC communication system 100 according to another exemplary embodiment, includes a plurality of MCU controllers 12 connected to the same communication network 16, therefore, the local control modules 30 may be operatively connectable via respective MCU controllers 12. That is, some of the local control modules 30 may be in communication with one MCU controller 12, while the remaining local control modules 30 may be in communication with another MCU controller 12, for example. Alternatively, there may be more than one MCU controller 12 communicating with the same local control modules 30. The MCU controllers 12 may send signals to same or different local control modules 30 based upon pre-programming, for example. According to another embodiment, a MCU controller 12 of the plurality of MCU controllers 12 may also operate on a dedicated line to specific local control modules 30.

According to an exemplary embodiment, the local control modules 30 are connected in a daisy-chain configuration (as depicted in FIG. 3, for example). Alternatively, the MCU controller 12 and the local control modules 30 may be connected in a star format where each local control module 30 is connected to a MCU controller 12 via a dedicated wire cable. However, the present invention is not limited hereto, and any suitable configuration may be used.

Further, according to an exemplary embodiment, the communication network 16 may be a supervisory control data acquisition (SCADA) network, for example. The communication network 16 may be a wired network. Further, according to one exemplary embodiment, the communication media of the communication network 16 is a two-wire cable or low voltage four-wire cable, for example, internal to or external to the MCC 17 and extending to the MCU controller 12. In an embodiment, the low voltage of the two-wire or four-wire cable is approximately 12 V or 24 V, for example. However, the present invention is not limited hereto, and may vary accordingly. For example, optical fiber may be used or the communication network may be a wireless network as described below with reference to FIG. 5.

Figure 5:
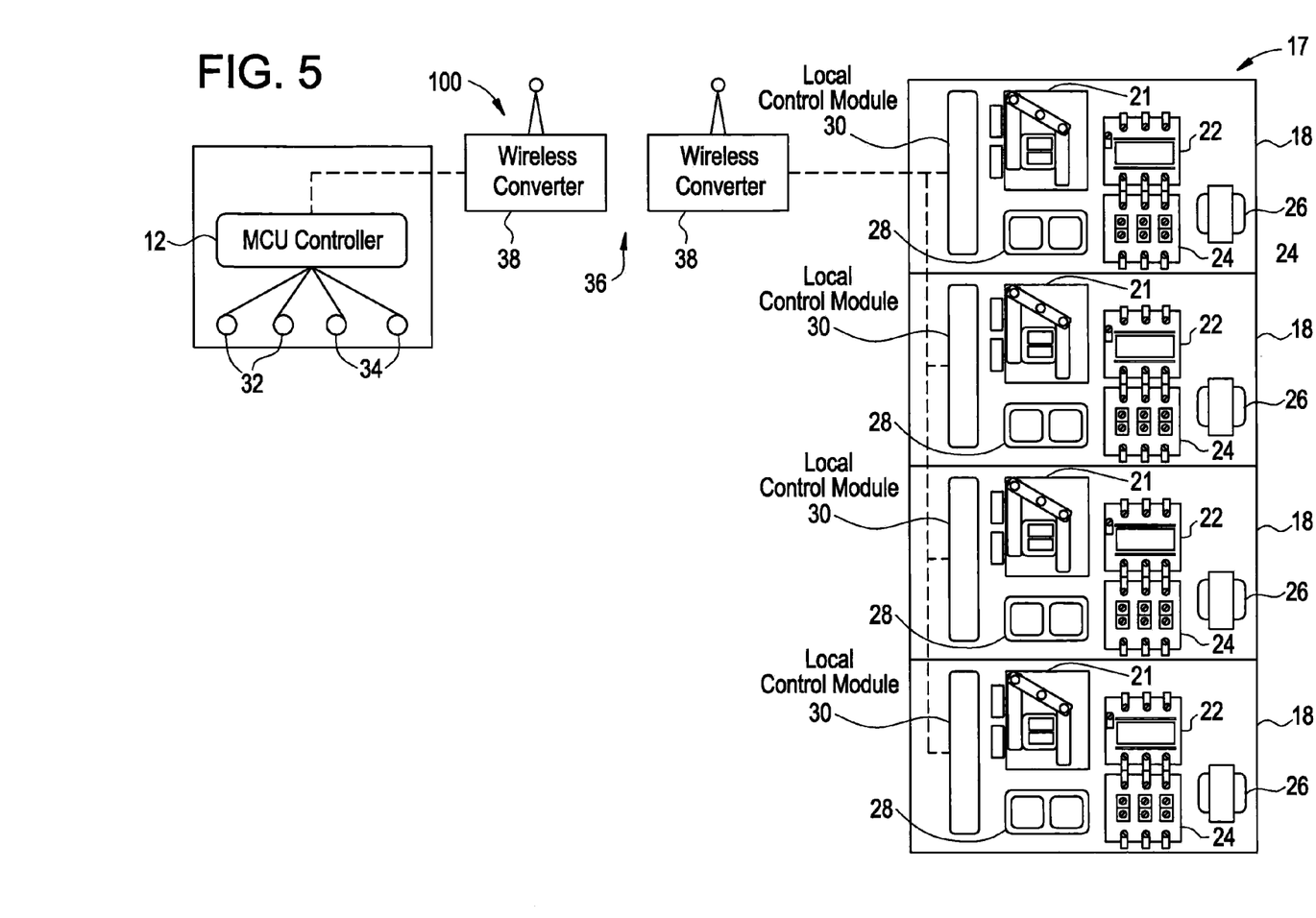
FIG. 5 is a diagram of a MCC communication system that can be implemented within alternative embodiments of the present invention.

FIG. 5 illustrates a MCC communication system that can be implemented according to alternative embodiments of the present invention. Some of the features shown in FIG. 5 are the same as those shown in FIG. 3 therefore, a detailed description of these features has been omitted. As shown in FIG. 5, the MCU controller 12 and the local control modules 30 communicate with each other via a wireless network 36. The wireless network 36 includes a plurality of wireless converters 38 which are wired respectively the MCU controller 12 and the local control modules 30.

A detailed description of the MCU controller 12 and the local control modules 30 will now be described with reference to FIGS. 6 through 9.

Figure 6:
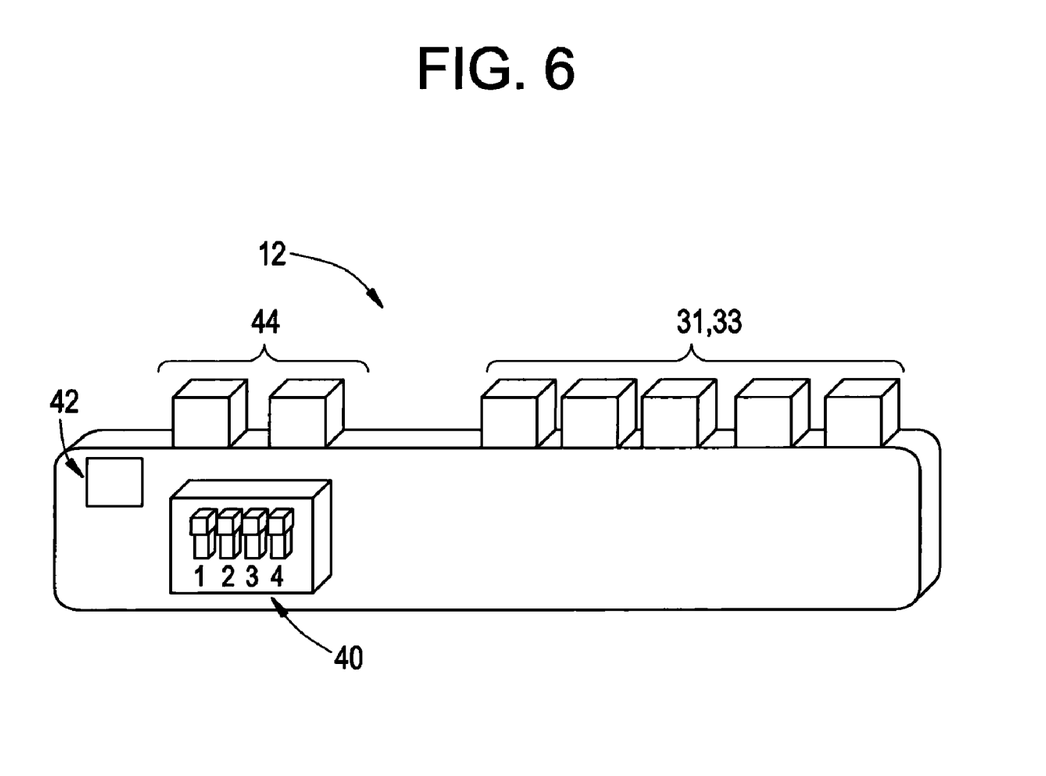
FIG. 6 is a detailed schematic diagram of a MCU controller of a MCC communication system that can be implemented within embodiments of the present invention.

FIG. 6 illustrates a MCU controller 12 according to an exemplary embodiment of the present invention. As shown in FIG. 6, the MCU controller 12 is an electrical device that includes input devices 32 (as depicted in FIG. 3, for example) connected to input ports 31 and status indicators 34 (as depicted in FIG. 3) connected to output ports 33, an address setting device 40, a communication port 42 and power connectors 44. The MCU controller 12 has a selectable communication address which can be assigned via the address setting device 40. According to the current exemplary embodiment, the address setting device 40 is a series of dip switches as shown in FIG. 6, however, the present invention is not limited hereto. Alternatively, the communication address of the MCU controller 12 may be set via a computer or a rotary dial, for example. Since the MCU controller 12 has a selectable communication address, when there is a plurality of MCU controllers 12 on the same communication network 16, each MCU controller 12 can be uniquely identified. Further, each MCU controller 12 can be pre-programmed during manufacturing or during use in the MCC communication system 100. The communication port 42 connects the MCU controller 12 to the local control modules 30. The power connectors 44 are used to supply power to the MCU controller 12 from a power source. Additional details concerning the operations of the MCU controller 12 are described below with reference to FIG. 7.

Figure 7:
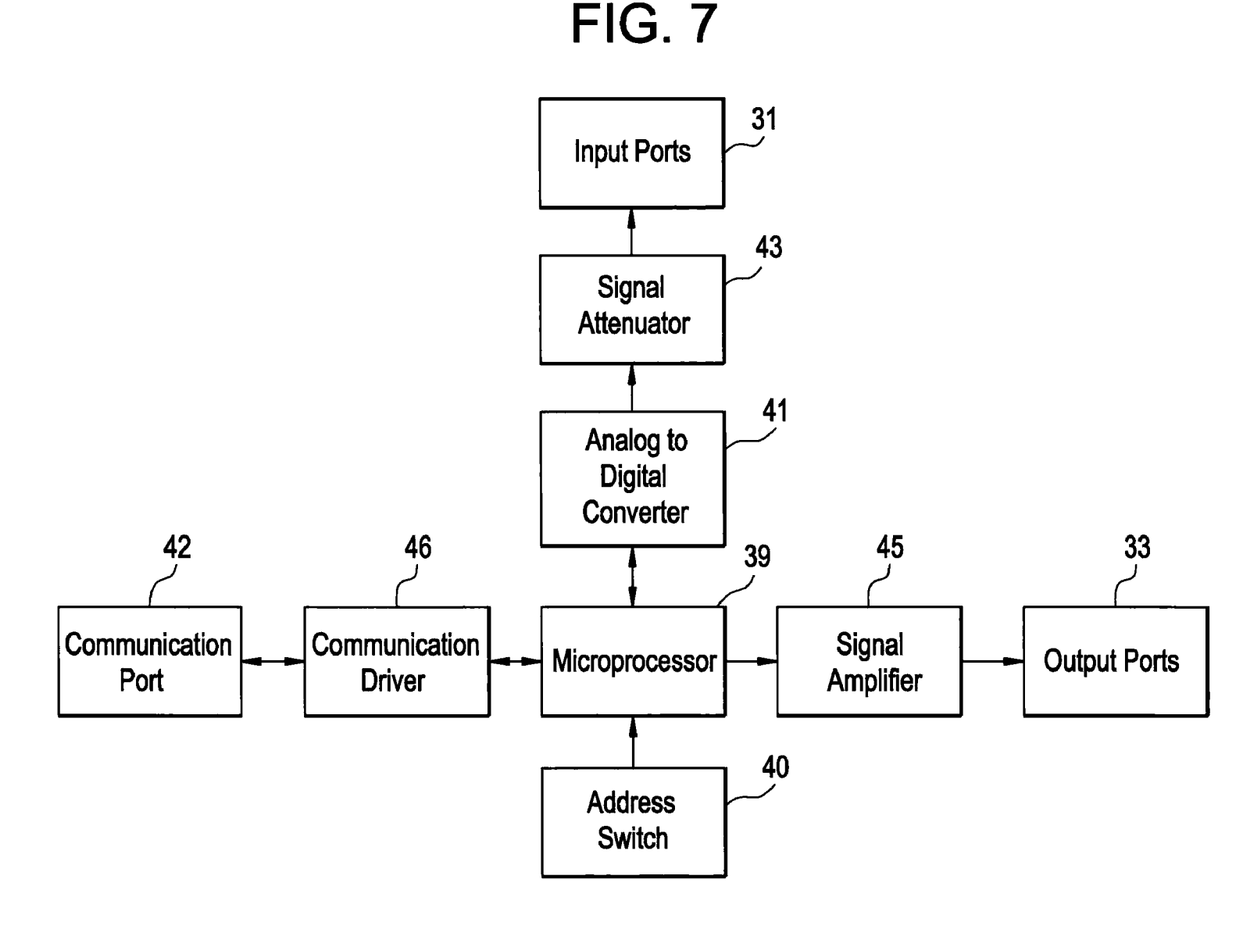
FIG. 7 is a block diagram of the MCU controller shown in FIG. 5 that can be implemented within embodiments of the present invention.

As shown in FIG. 7, the MCU controller 12 further includes a microprocessor 39, an analog/digital (A/D) converter 41 and a communication driver 46. The MCU controller 12 transmits and receives signals to and from the local control modules 30 by the microprocessor 39 via the communication port 42. The communication driver 46 processes signals, received from and sent to the local control modules 30 via the communication port 42, into input and output signals for the microprocessor 39. According to one embodiment, the MCU controller 12 may further includes a signal attenuator 43 which scales the input signals to a range compatible to the A/D converter 41. For example, MCU controller 12 is configured to request a status of an electronic component such as a magnetic contactor, for example, of a respective motor control unit 18, by having the microprocessor 39 send a request to the respective local control module 30. Based on the status information received from the respective local control module 30, the microprocessor 39 may then send a request to the respective local control module 30 to actuate the magnetic contactor 22. As mentioned above, input devices 32 and status indicators 34 (shown in FIG. 3, for example) are connected respectively to the input and output ports 31 and 33. The microprocessor 39 may send a signal amplified via a signal amplifier 45, for example, to the status indicator 34 via the output port 33.

Figure 8:
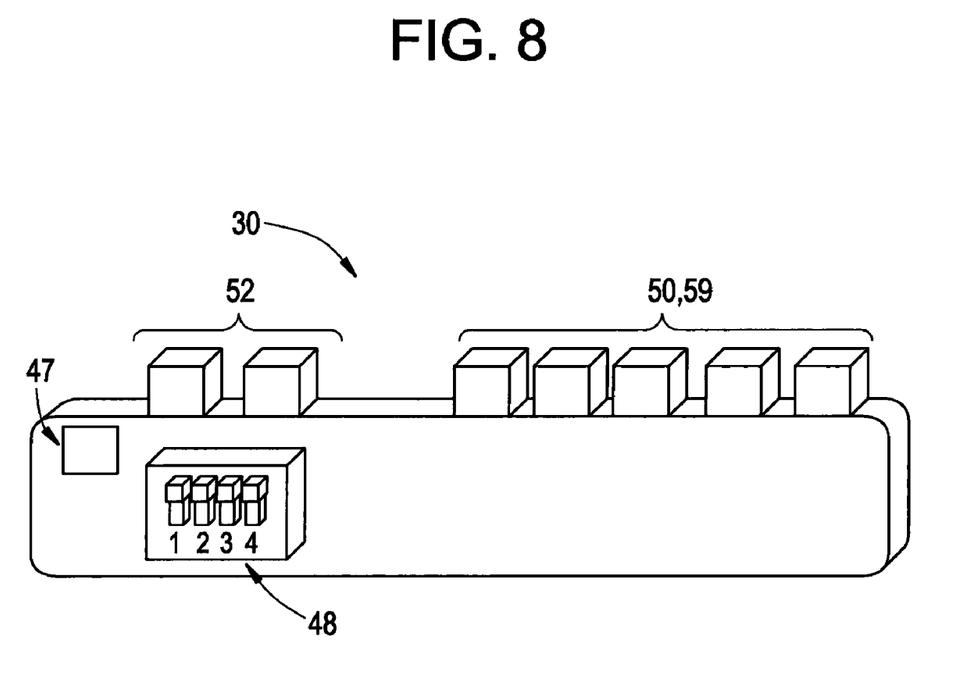
FIG. 8 is detailed schematic diagram of a local control module of a motor control unit of a MCC communication system that can be implemented within embodiments of the present invention.

FIG. 8 illustrates a local control module 30 that can be implemented within embodiments of the present invention. As shown in FIG. 8, the local control module 30 has similar features as those of the MCU controller 12. The local control module 30 is an electrical device that includes a communication port 47, an address setting device 48, input/output ports 50 and 59 and power connectors 52. Each local control module 30 is operatively connected to the MCU controller 12 or to another local control module 30 via the communication port 47. The local control modules 30 send and receive data signals via the communication port 47. The local control module 30 measures the voltage, for example, on the magnetic contactor 22 and sends it to the MCU controller 12 based on commands received from the MCU controller 12. The address setting device 48 is used to select a communication address for the local control module 30. As shown in FIG. 8, the address setting device 48 is a series of dip switches. Alternatively, the communication address of the local control module 30 may be set via a variety of suitable devices and methods such as but not limited to a rotary dial, or by connecting the local control module 30 directly to a computer and providing software on the computer to place the local control module 30 into a programming mode. The input/output connectors 50 and 59 may include pushbuttons, status indicators, for example. The power connectors 52 are used to supply power to the local control module 30 from a power source. Additional details concerning the local control module 30 are described below with reference to FIG. 9.

Figure 9:
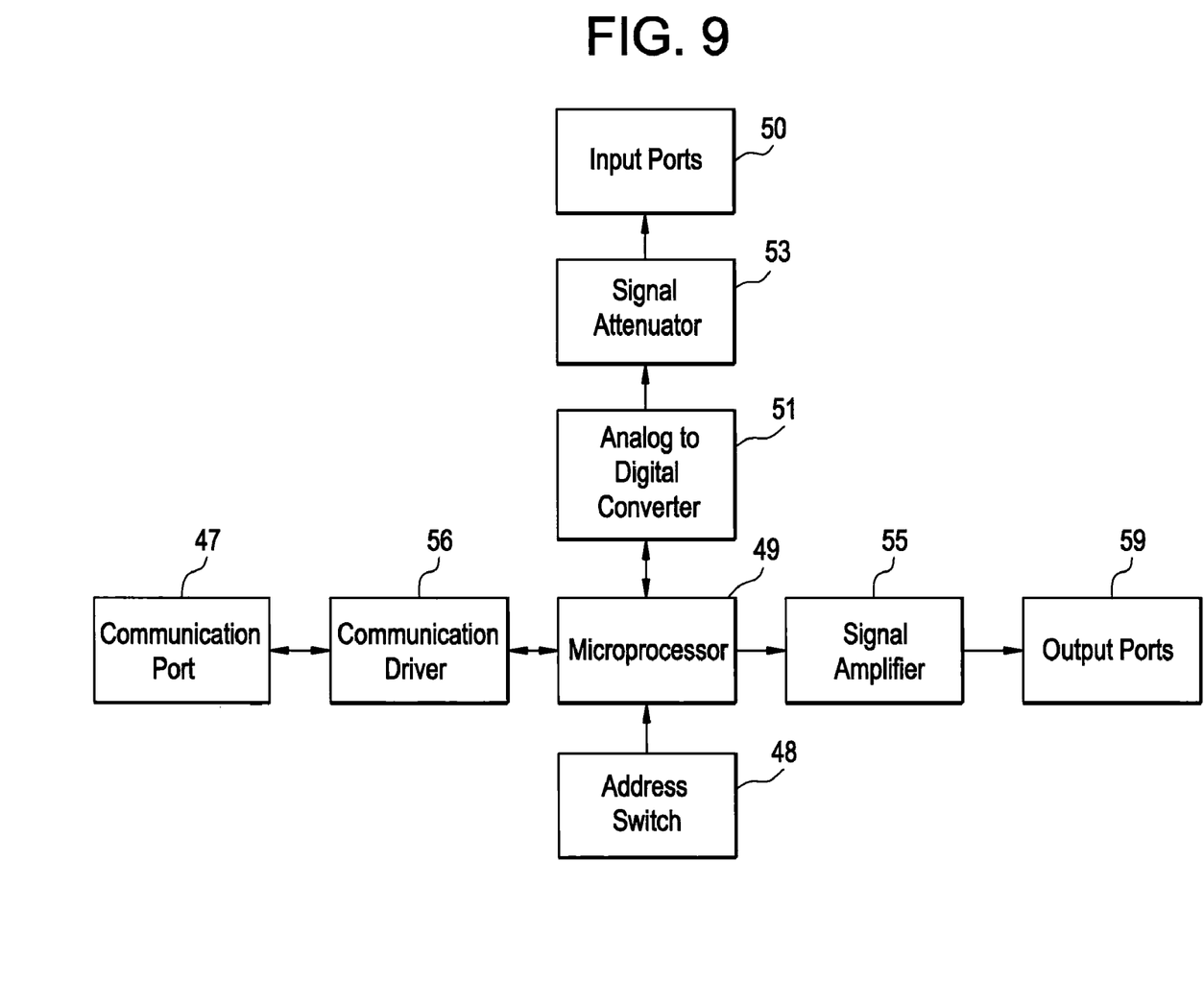
FIG. 9 is a block diagram of the local control module shown in FIG. 8 that can be implemented within embodiments of the present invention.

As shown in FIG. 9, according to an embodiment of the present invention, each local control module 30 further includes a microprocessor 49 and an A/D converter 51. The local control module 30 transmits and receives signals to and from the MCU controller 12 by the microprocessor 49 via the communication port 47. According to one embodiment, the local control module 30 may further include a communication driver 56 which processes signals, transmitted to and received from the MCU controller 12 via the communication port 47, into input signals and output signals for the microprocessor 49. Motor start contacts 71 (as depicted in FIG. 12), the overload relay 24 and auxiliary contacts M (as depicted in FIG. 12) for example, of a respective motor control unit 18 are connected to the input ports 50. According to one embodiment, a signal attenuator 53 may be provided to scale the input signals to a range compatible to the A/D converter 51. When a respective local control module 30 receives a request for the status of a magnetic contactor 22, for example, of the respective motor control unit 18 via the MCU controller 12, the microprocessor 49 of the local control module 30 reads samples from the A/D converter 51. In addition, coils of the magnetic contactor 22 and overload relay 24, and indicator lights are connected to the output ports 59. When the local control module 30 is instructed by the MCU controller 12 to actuate the magnetic contactor 22, for example, the microprocessor 49 applies a low voltage signal amplified to an appropriate level by a signal amplifier 55, for example, to the auxiliary contacts M to actuate the magnetic contactor 22, via the output ports 59.

Figure 10:
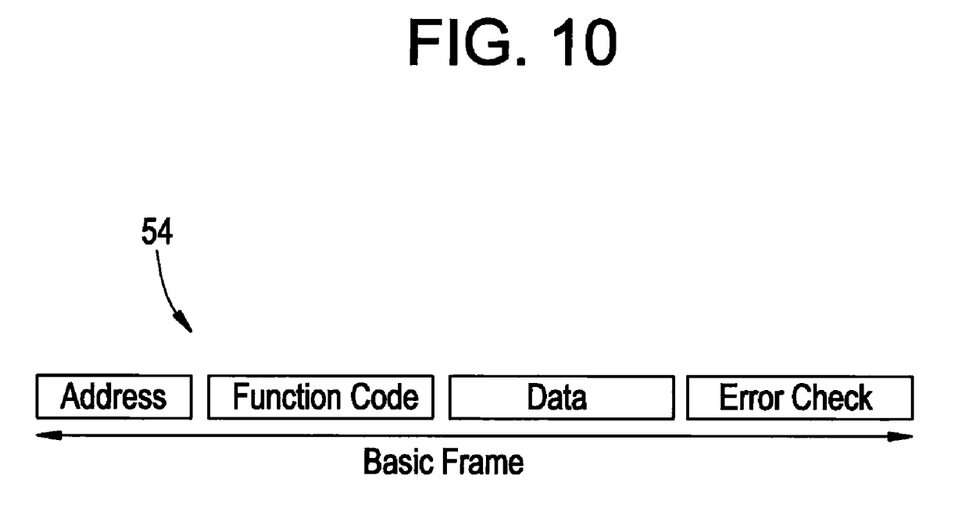
FIG. 10 is diagram of a communication protocol between MCU controllers and local control modules that can be implemented within embodiments of the present invention.

FIG. 10 illustrates a communication protocol for transmitting data signals between the MCU controller 12 and the local control modules 30, for example. The MCU controller 12 and the local control modules 30 transmit basic frame or packet information. As shown in FIG. 10, the basic frame 54 includes an address of the receiving device, i.e., the MCU controller 12 or the local control module 30, a function code which indicates a type of action the receiving device is to perform with the data received, for example, read or write. In addition, the basic frame 54 includes data information corresponding to the particular transmitting device. For example, for MCU controller transmission, each individual bit indicates a requested state of the local control module 30, and for local control module transmission, each individual bit indicates a current status of the magnetic contactor 22 of the respective motor control unit 18. Further, the basic frame 54 includes error information that indicates the validity of the frame information to ensure that the frame sent has not been corrupted.

Figure 11:
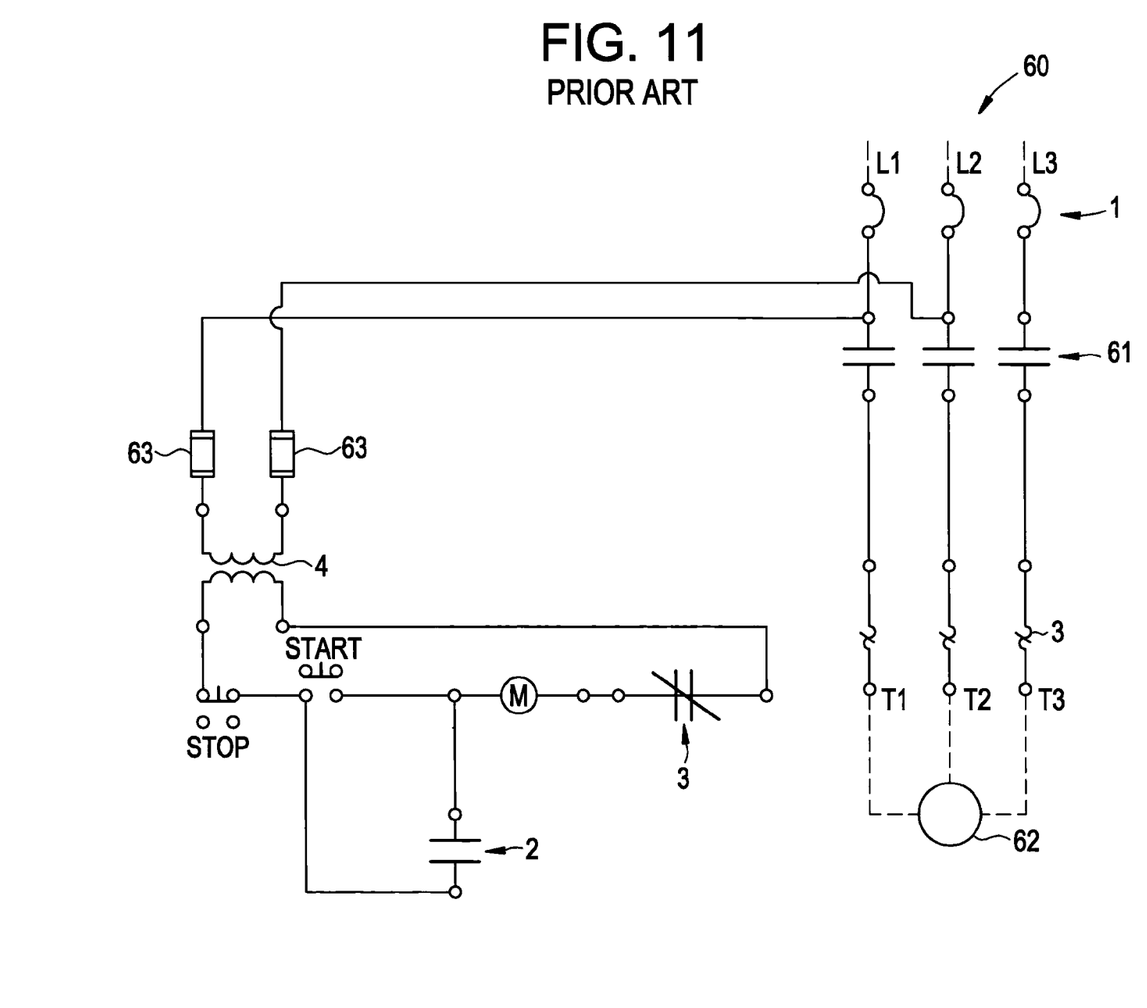
FIG. 11 is a circuit diagram of a conventional Full-voltage, Non-reversing (FVNR) Motor Starter.

FIGS. 11 and 12 illustrate a conventional full voltage, non-reversing (FVNR) motor starter and a FVNR motor starter according to an exemplary embodiment of the present invention, respectively.

As shown in FIG. 1, the conventional FVNR motor starter 60 is within the conventional motor control unit 10. As shown in FIG. 11, three-phase power L1, L2 and L3 flows into the MCC communication system 20 (as depicted in FIG. 2). The flow of the three-phase power L1, L2 and L3 is protected by the disconnect/circuit breaker 1. In addition, motor starter contacts 61, coils and auxiliary contacts M are actuated to start and stop the motor 62. Further, the overload relay 3 is provided to protect against overcurrent, and the interfaces T1, T2, and T3 interface with the motor 62. Fuses 63 are also provided to protect the three-phase power and the power is transformed into an operating power via the control power transformer 4. A start pushbutton START (i.e., open) and a stop pushbutton STOP (i.e., close) are provided at the individual motor control units 10. Therefore, when the start pushbutton START is activated, voltage across the magnetic contactor 2 will cause the contacts to close and current to flow to the motor 62. On the other hand, when the stop pushbutton STOP is activated, the current connection is broken. The control operation of the motor control units 10 is performed at the individual motor control units 10.

FIG. 12 illustrates a FVNR motor starter according to an exemplary embodiment of the present invention. The present invention is not limited to using a FVNR motor starter and may vary, accordingly. As shown in FIG. 12, three-phase power L1, L2 and L3 flows into the motor control unit 18, the motor control unit 18 includes a disconnect/circuit breaker 21 that controls the flow of the three-phase power L1, L2 and L3 to downstream components including motor start contacts 71, overload relay 24 and the motor 72. The motor control unit 18 receives the power and transforms the power into an operating power via the control power transformer 26. In addition, to the stop pushbutton STOP, and the start pushbutton START, the FVNR motor starter 70 includes a remote motor stop relay RSTOP and a remote motor start relay RSTART which correspond to normally-open (NO) contacts and normally closed (NC) contacts. The remote motor start relay RSTART and the motor stop relay RSTOP are external to the local control module 30 and the relay coils are actuated by an output of the local control module 30. The local control module 30 reads the status of magnetic contactor 22, and auxiliary devices including auxiliary contacts M and sends the contact status information to the MCU controller 12. The MCU controller 12 then instructs the local control module 30 to close or open the contacts, in order to start or stop the motor 72.

The MCC communication system 100 according to an exemplary embodiment of the present invention provides the advantages of having a centralized control at the MCU controller 12, selectable addresses at the MCU controller 12 and the local control modules 30, and low voltage control wiring between the MCU controller 12 and the local control modules 30 or wireless communication between the MCU controller 12 and the local control modules 30, to enable flexibility for expanding the MCC communication system 100.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A motor control center communication system configured to interface with a communication network, the system comprising:
a plurality of motor control units (MCUs); and
a MCU controller configured to transmit and receive data signals via the communication network to and from the plurality of MCUs, wherein each of the plurality of MCUs comprises:
a magnetic contactor having electrical contacts operable between open and closed positions, and
a local control module operatively connected to the magnetic contactor and to the MCU controller, the local control module configured to monitor a status of the electrical contacts, the local control module further configured to transmit status information corresponding to the status of the electrical contacts to the MCU controller in response to a first data signal received from the MCU controller that requests the status information, the local control module further configured to actuate the magnetic contactor in response to a second data signal received from the MCU controller.

2. The motor control center communication system of claim 1, wherein the MCU further comprises a remote motor start relay and a remote motor stop relay, the remote motor start relay and remote motor stop relay being disposed external to the local control module and configured to be actuated based on an output of the local control module, to at least one of start or stop a motor.

3. The motor control center communication system of claim 1, wherein the MCU controller comprises:
at least one input device configured to receive commands;
a communication port which is configured to transmit the commands to the local control modules, via the communication network;
at least one status indicator which is configured to indicate a status of the local control modules.

4. The motor control center communication system of claim 3, wherein the MCU controller further comprises an address setting device configured to set a communication address of the MCU controller.

5. The motor control center communication system of claim 3, wherein a communication address of the MCU controller is selectable via a computer.

6. The motor control center communication system of claim 1, wherein the local control module comprises a communication port configured to operatively connect the local control module to another local control module and to the MCU controller, and which is configured to transmit to and receive data signals from the MCU controller.

7. The motor control center communication system of claim 6, wherein the local control module is configured to measure voltage on the associated magnetic contactor and is further configured to transmit the measurement to the MCU controller in response to data signals received from the MCU controller.

8. The motor control center communication system of claim 6, wherein the local control module further comprises an address setting device configured to set a communication address of the local control module.

9. The motor control center communication system of claim 6, wherein a communication address of the local control module is set via a computer.

10. The motor control center communication system of claim 1, wherein the local control module for each of the plurality of MCUs is connected to the other local control modules of the plurality of MCUs in a daisy-chain configuration.

11. The motor control center communication system of claim 1, wherein the system further comprises a plurality of MCU controllers configured to connect with the communication network and each local control module is configured to operatively connect to other local control modules via respective MCU controllers.

12. The motor control center communication system of claim 11, wherein:
one of the plurality of MCU controllers includes a first local control module; and
the plurality of MCU controllers are configured to communicate with the first local control module.

13. The motor control center communication system of claim 1, wherein the communication network is a wired network comprising one of a two-wire cable or four-wire cable.

14. The motor control center communication system of claim 13, wherein the wired network is of a voltage of approximately 12 V or 24 V.

15. The motor control center communication system of claim 1, wherein the communication network is a wireless network comprising wireless converters respectively wired to the MCU controller and the local control modules, wherein the MCU controller and the local control modules communicate with each other via the wireless network.

16. The motor control center communication system of claim 1, comprising a remote panel, wherein the MCU controller is disposed in the remote panel.

17. A motor control unit (MCU) for a motor control center communication system, the MCU comprising:
a magnetic contactor having electrical contacts operable between open and closed positions; and
a local control module operatively connected to the magnetic contactor and to a MCU controller disposed external to the MCU, the local control module configured to monitor a status of the electrical contacts, the local control module further configured to transmit status information corresponding to the status of the electrical contacts to the MCU controller via a communication network in response to a first data signal received from the MCU controller that requests the status information, the local control module further configured to actuate the magnetic contactor in response to a second data signal received from the MCU controller.

18. The MCU of claim 17, wherein the local control module comprises a communication port configured to operatively connect the local control module to another local control module or to the MCU controller and sends and receives data signals through the communication port via the communication network.

19. The MCU of claim 17, further comprising a remote motor start relay and a remote motor stop relay, the remote motor start relay and remote motor stop relay being disposed external to the local control module and configured to be actuated based on an output of the local control module, to at least one of start or stop a motor.

* * * * *